(12) United States Patent
Bottomley et al.

(10) Patent No.: US 7,236,514 B2
(45) Date of Patent: Jun. 26, 2007

(54) COMMUNICATIONS METHODS, APPARATUS AND COMPUTER PROGRAM PRODUCTS USING GAIN MULTIPLIERS

(75) Inventors: Greg Bottomley, Cary, NC (US); Yi-Pin Eric Wang, Cary, NC (US); Essam Sourour, San Diego, CA (US); Jian-Ching Guey, Apex, NC (US)

(73) Assignee: Ericsson, Inc., Plano, TX (US)

( * ) Notice: Subject to any disclaimer, the term of this patent is extended or adjusted under 35 U.S.C. 154(b) by 934 days.

(21) Appl. No.: 09/968,443

(22) Filed: Oct. 1, 2001

(65) Prior Publication Data

US 2003/0092447 A1    May 15, 2003

(51) Int. Cl.
*H04B 1/00* (2006.01)
(52) U.S. Cl. .................... 375/147; 375/345
(58) Field of Classification Search ........ 375/144–145, 375/147–149, 140, 141, 345; 370/311, 318, 370/332, 335, 342; 455/69, 62–63, 266, 455/339, 340, 450, 522
See application file for complete search history.

(56) References Cited

U.S. PATENT DOCUMENTS

| | | | | |
|---|---|---|---|---|
| 5,506,865 A | * | 4/1996 | Weaver, Jr. ................ | 370/335 |
| 5,872,775 A | * | 2/1999 | Saints et al. ............... | 370/342 |
| 6,167,273 A | * | 12/2000 | Mandyam .................... | 455/450 |
| 6,173,162 B1 | | 1/2001 | Dahlman et al. | |
| 6,334,047 B1 | * | 12/2001 | Andersson et al. .......... | 455/69 |
| 6,452,917 B1 | * | 9/2002 | Leung ......................... | 370/342 |
| 6,493,329 B1 | * | 12/2002 | Leung ......................... | 370/335 |
| 6,700,919 B1 | * | 3/2004 | Papasakellariou ........... | 375/130 |
| 6,728,307 B1 | * | 4/2004 | Derryberry et al. .......... | 375/219 |
| 2003/0003889 A1 | * | 1/2003 | Perets ......................... | 455/266 |
| 2003/0035468 A1 | * | 2/2003 | Corbaton et al. ............ | 375/148 |

FOREIGN PATENT DOCUMENTS

EP        1 032 168 A2    8/2000
WO       WO 99/39452     8/1999

OTHER PUBLICATIONS

Universal Mobile Telecommunications System (UMTS): Physical Layer Procedures (FDD) (3GPP TS 25.214 Version 3.4.0 Release 1999), Sep. 2000, 48 pages.

(Continued)

*Primary Examiner*—David B. Lugo

(57) ABSTRACT

A communications signal is processed to determine a proportionality relationship between a gain of a first channel (e.g., a pilot channel) and a gain of a second channel (e.g., a traffic channel) from a model of the first channel and information recovered from the second channel according to the model of the first channel. Symbol estimates may be generated from the information received over the second channel based on the determined proportionality relationship. In some embodiments, a gain multiplier may be estimated from information received over the second channel, a channel estimate for the first channel and a noise estimate for the first channel, for example, by generating despread values from the information received over the second channel, processing the despread values according to the channel estimate to generate symbol estimates, and generating the estimate of the gain multiplier from the noise estimate and the symbol estimates. Methods, apparatus and computer program products are provided.

42 Claims, 9 Drawing Sheets

OTHER PUBLICATIONS

Tanaka et al., "Pilot Symbol-Assisted Decision-Directed Coherent Adaptive Array Diversity for DS-CDMA Mobile Radio Reverse Link," IEICE Transactions on Fundamentals of Electronics, Communications and Computer Sciences, Institute of Electronics, Information and Comm. Eng., Tokyo, Japan, vol. E80-A, No. 12, Dec. 1, 1997, pp. 2445-2453.

European Search Report, U.S. Application No. 09/968,443, Oct. 1, 2001.

3rd Generation Partnership Project: Technical Specification Group Radio Access Network; Physical layer procedures (FDD), Release 1999, 46 pages.

* cited by examiner

COMMUNICATIONS METHODS, APPARATUS AND COMPUTER PROGRAM PRODUCTS USING GAIN MULTIPLIERS

BACKGROUND OF THE INVENTION

The present invention relates to communications methods, apparatus and computer program products, and more particularly, to channel characterization and symbol estimation methods, apparatus, and computer program products.

Wireless communications techniques are widely used to communicate information, such as voice information or data for applications, such as video or web page information. A variety of different radio interfaces may be used for such wireless communications, including those that use frequency division multiple access (FDMA) techniques, time division multiple access (TDMA) techniques, and code division multiple access (CDMA) techniques.

In a typical CDMA wireless system, channels for communicating between entities, e.g., between a cellular base station and a wireless terminal, such as a cellular telephone, are defined through the use of spreading codes that spread transmitted radio frequency signals across a shared spectrum. As is well known, signals encoded in such a fashion may be recovered at a receiving station through knowledge of the spreading code.

In CDMA systems, transmit power may be controlled to reduce interference between channels and, thus, maximize system capacity. For example, third generation CDMA system standards, including both Wideband-CDMA (WCDMA) and IS-2000, include provisions for fast and slow downlink power control mechanisms. With fast downlink power control, a terminal (e.g., mobile station) requests that the downlink power be either +x dB or −x dB for a future block of data. In WCDMA, the block of data is a slot, whereas in IS-2000, the block of data is referred to as a power control group. The value of x is typically 1 dB or less and is known at the mobile station.

The base station may respond to the power control request in many ways. It may receive the request correctly and perform the requested change. If the power has reached a maximum or minimum allowed per-user power level, the base station may ignore the request. If the request is received in error, the base station may incorrectly respond. The base station may also ignore the request entirely.

The base station may also adjust downlink power more slowly due to open-loop power control and transmit power limitations. Open-loop power control may be performed based on the received power at the base station.

Early versions of the W-CDMA standard proposed the use of dedicated pilot symbols in traffic channels for traffic channel estimation, providing a way to track traffic channel changes resulting from fast power control. However, a common pilot channel has been recently introduced in W-CDMA. The current IS-2000 standard includes a common pilot channel that is available for channel estimation, but does not include pilot symbols within the traffic channels.

SUMMARY OF THE INVENTION

According to embodiments of the present invention, a communications signal is processed to determine a proportionality relationship between a gain of a first channel (e.g., a pilot channel) and a gain of a second channel (e.g., a traffic channel) from a model of the first channel and information recovered from the second channel according to the model of the first channel. Symbol estimates may be generated from the information received over the second channel based on the determined proportionality relationship. In some embodiments of the present invention, a gain multiplier may be estimated from information received over the second channel, a channel estimate for the first channel and a noise estimate for the first channel. For example, despread values may be generated from the information received over the second channel and processed according to the channel estimate to generate symbol estimates. The estimate of the gain multiplier may be generated from the noise estimate and the symbol estimates.

The present invention may be embodied as methods, apparatus, and computer program products.

DETAILED DESCRIPTION

Figure 1:
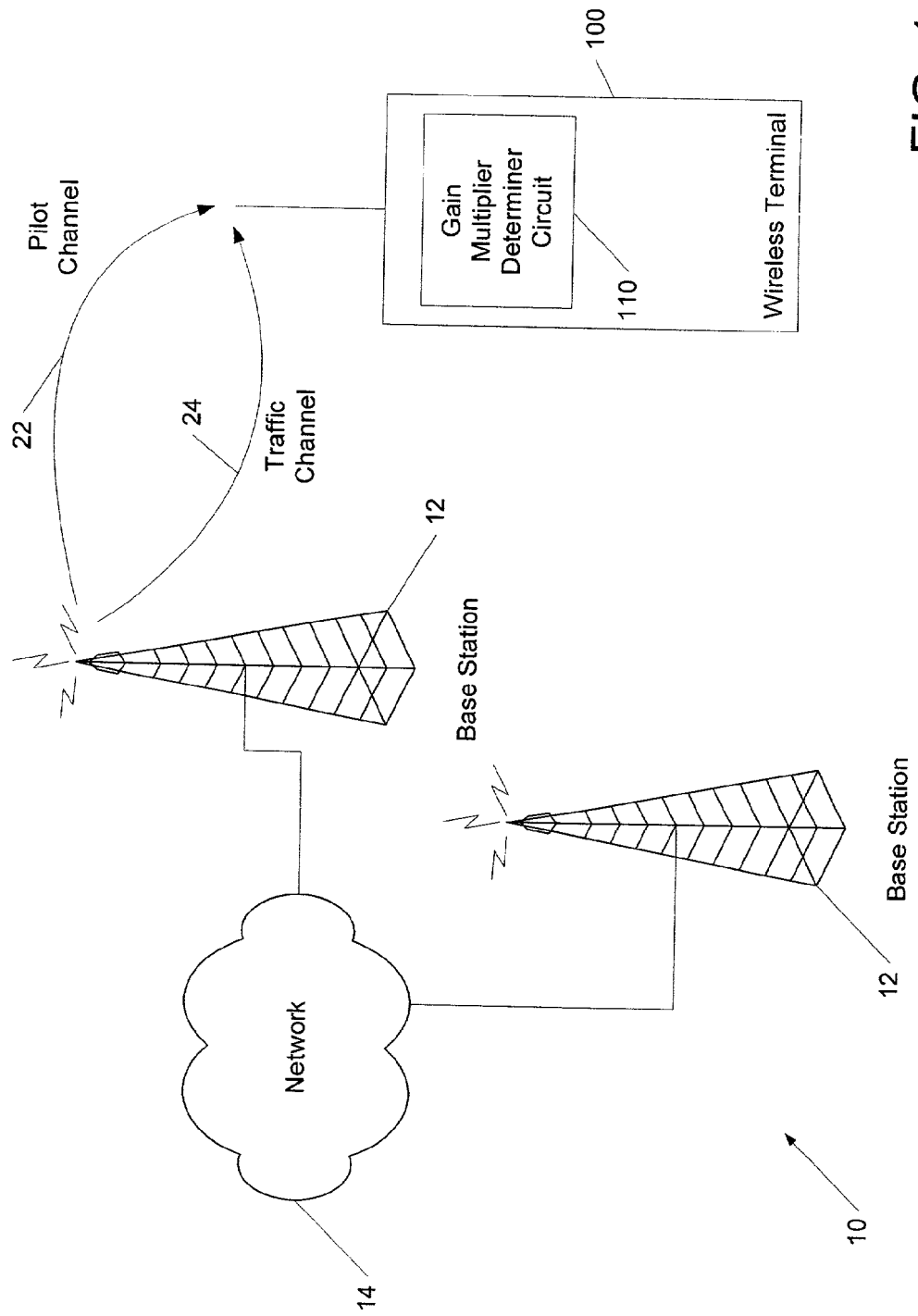
FIG. 1 is a schematic diagram illustrating a wireless communications system and terminal apparatus according to embodiments of the present invention.

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In the present application, FIGS. 1–9 are schematic diagrams and flowcharts illustrating exemplary communications apparatus and operations according to embodiments of the present invention. It will be understood that blocks of the schematic diagrams and flowcharts, and combinations of blocks therein, may be implemented using one or more electronic circuits, such as circuits included in a wireless terminal or in a wireless communications system (e.g., in a cellular base station or other device), or circuitry used in other types of wireless, wireline, optical and other communications systems. It will also be appreciated that, in general, blocks of the schematic diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the operations specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the operation specified in the block or blocks.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a wireless terminal or a wireless communications system and/or in an apparatus and/or storage medium operable to program such memory. Accordingly, blocks of the schematic diagrams and flowcharts of FIGS. 1–9 support electronic circuits and other means that perform the specified operations, acts for performing the specified operations, and computer program products configured to perform the specified operations.

It will also be appreciated that the apparatus and operations illustrated in FIGS. 1–9 may be implemented in a variety of communications environments, including wireless, wireline and optical communications environments. For example, the communications apparatus and operations illustrated in FIGS. 1–9 may be embodied in a wireless terminal (e.g., a cellular telephone, wireless-capable laptop computer or wireless-capable personal digital assistant (PDA)), a wireless base station, a wireline communications device, an optical communications device, or other communications apparatus. It will be appreciated that the processing apparatus and operations illustrated in FIGS. 1–6 may be combined with other apparatus and operations (not shown), including additional signal processing apparatus (e.g., circuits that provide such capabilities) and operations.

According to embodiments of the present invention illustrated in FIG. 1, a wireless communications device, such as a wireless terminal 100, receives information from a wireless communications system 10, here shown as including base stations 12 and an interconnecting network 14. In particular, the terminal 100 receives known information from a base station 12 over a pilot channel 22, and receives other information, e.g., voice or data, from the base station 12 over a traffic channel 24. The wireless terminal 100 includes a gain multiplier determiner circuit 110 that determines a proportionality relationship, in particular, a gain multiplier, which relates gain of the pilot channel 22 to gain of the traffic channel 24. For example, as described below, the gain multiplier determiner circuit 110 may estimate a gain multiplier from a channel response estimate and a noise estimate for the pilot channel 22, combined with estimates of traffic channel symbols that are generated assuming the traffic channel 24 has the same channel response (transfer characteristic) as the pilot channel 22.

In various embodiments of the present invention, gain multipliers may be "determined" in a number of different ways. For example, as shown below, a gain multiplier for a wireless traffic channel may be explicitly determined by generating optimal or suboptimal solutions to functions of a model of a wireless pilot channel and estimates of symbols recovered from the traffic channel according to the pilot channel model. Such an explicitly generated gain multiplier may then be used to generate revised symbol estimates for the traffic channel. However, it will be appreciated that such a gain multiplier may also be implicitly determined as part of a procedure for estimating symbols received over a traffic channel, e.g., as part of a symbol estimation procedure that assumes a channel model in which gain of the traffic channel is modeled as a product of the gain of the pilot channel and the gain multiplier.

Figure 2:
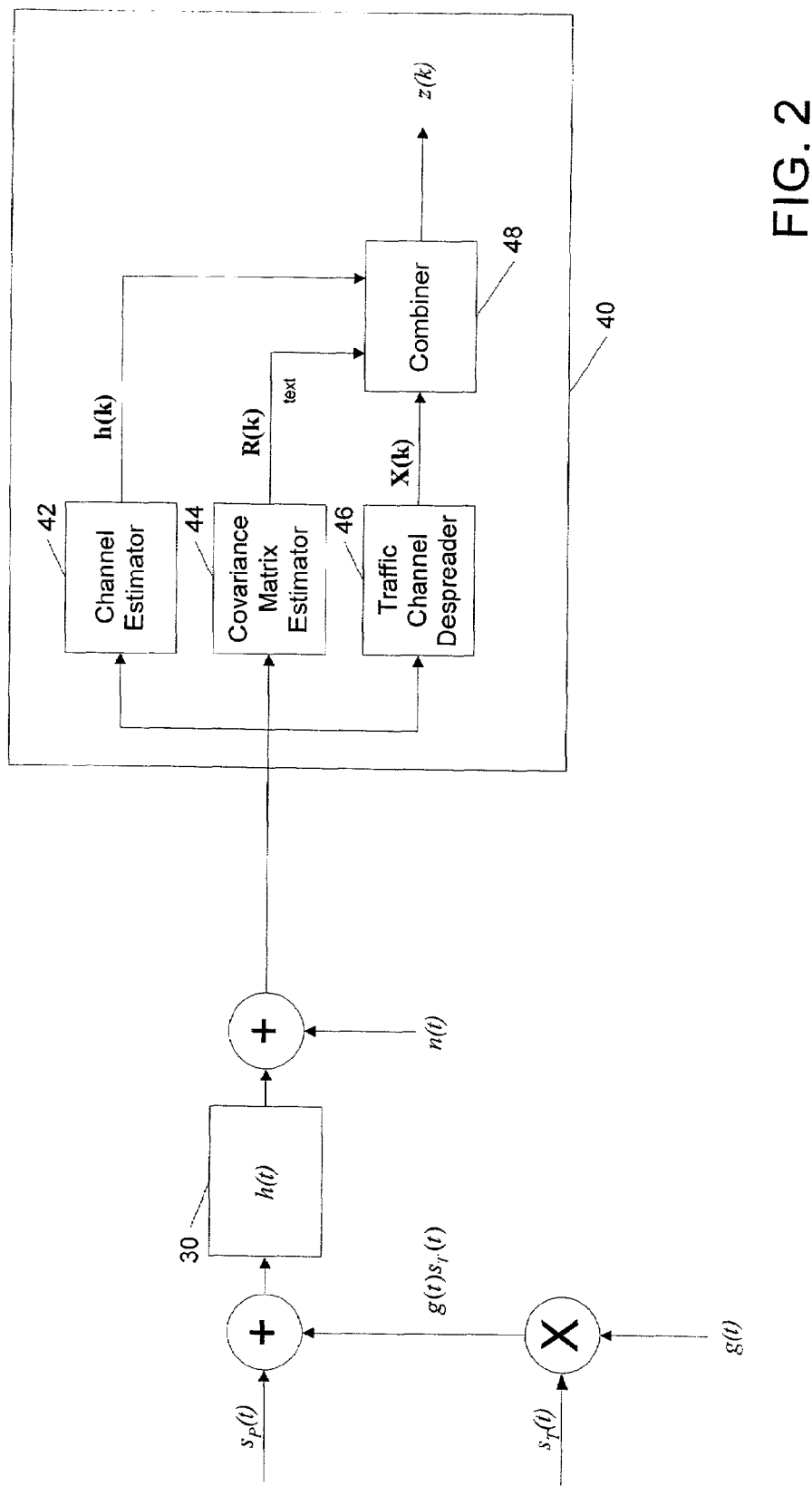
FIG. 2 is a schematic diagram illustrating a system model according to embodiments of the present invention.

A system model according to embodiments of the present invention is illustrated in FIG. 2. A pilot channel signal $s_P(t)$ and a traffic channel signal $s_T(t)$ are generated at a base station or other node of a wireless communications system. While the transmitted power of the pilot channel signal $s_P(t)$ is approximately constant, the transmitted power of the traffic channel signal $s_T(t)$ may be affected by a power control mechanism. In FIG. 2, it is assumed that the pilot channel and traffic channel signals $s_P(t)$, $s_T(t)$ are of equal power, with a multiplier g(t) being used to model the time-varying power control applied to the traffic channel signal. The pilot channel signal $s_P(t)$ and the multiplied traffic channel signal $g(t)s_T(t)$ are transmitted over a common channel 30 having a channel response h(t). Noise n(t) is injected before the resulting signal $h(t)*(s_P(t)+g(t)s_T(t))+n(t)$ is received at a receiver 40 ("*" denotes a convolution operation).

The pilot channel signal $s_P(t)$ may be expressed as:

$$s_P(t) = \sum_k s_P(k) b_k(t - kT) \text{ where} \quad (1)$$

$$b_k(t) = \sum_m a_k(m) w_p(m) f(t - mT_c),$$

and where $s_P(k)$ is a modulation value for the k-th pilot channel symbol, $w_P(m)$ is a Walsh-Hadamard function assigned to the pilot channel, $f(t)$ is the chip pulse shape, $T_c$ is the chip period, T is a symbol duration, and $a_k(m)$ is a scrambling waveform applied to the pilot channel. Because the pilot channel symbol modulation value $s_P(k)$ is known, it can be assumed, for purposes of simplification, that $s_P(k)=1$ for all k. As a result, the pilot channel signal $s_P(t)$ may be given by:

$$s_P(t) = \sum_k b_k(t - kT). \quad (2)$$

Similarly, the traffic channel signal $s_T(t)$ may be given by:

$$s_T(t) = \sum_k g(k) s_T(k) c_k(t - kT), \text{ where} \quad (3)$$

$$c_k(t) = \sum_m a_k(m) w_T(m) f(t - mT_c),$$

and where $s_T(k)$ and g(k) are a modulation value and gain factor for a k-th traffic channel symbol, where $w_T(m)$ is the Walsh-Hadamard function assigned to the traffic channel.

The impulse response h(t) of the channel 30 over which the pilot channel signal and the traffic channel signal are transmitted can be expressed as:

$$h(t) = \sum_{l=0}^{L-1} h_l \delta(t - \tau_l), \quad (4)$$

where $h_l$ and $\tau_l$ are, respectively, a coefficient and a delay for an l-th multipath of a set of L multipaths, and $\delta(t)$ is an impulse function.

A traffic channel despreader 46 of the receiver 40 despreads the signal received at the receiver 40 to obtain a vector of despread traffic channel values X(k). It can be shown that the despread values may be given by:

$$X(k) = g(k)h(k)s_T(k) + n'(k), \quad (5)$$

where h(k) represents a composite channel estimate, and n'(k) denotes the impairment component, which results from thermal noise, own-cell interference, and other-cell interference. The despread values X(k) are combined in combiner 48 based on an estimate of the composite channel estimate h(k) and possibly an estimated noise covariance matrix R(k), to generate soft values z(k). Optimal combining weights for a channel with composite channel response h(k) and noise covariance matrix R(k) may be given by:

$$w(k) = h^H(k)R^{-1}(k). \quad (6)$$

A channel estimator 42 of the receiver 40 may process received pilot channel data, e.g., despread values generated from samples of the received signal despread by a pilot channel despreader (not shown), to generate an estimate of the composite channel response h(k). A noise covariance matrix estimator 44 may generate the noise covariance matrix R(k). For a conventional RAKE combining process, the noise covariance matrix R(k) may be approximated by the identity matrix. For other combining techniques, the noise covariance estimator 44 may generate the noise covariance matrix R(k) from the received pilot channel data. Exemplary techniques for determination of the channel response h(k) and the noise covariance matrix R(k) are described in U.S. Ser. No. 09/165,647 to G. E. Bottomley, titled "Method and Apparatus for Interference Cancellation in a RAKE Receiver," filed Oct. 2, 1998, now U.S. Pat. No. 6,363,104.

If the combining weights w(k) given in equation (6) are used for the traffic channel, soft values $\tilde{Z}(k)$ for the traffic channel may be given by:

$$\begin{aligned}\tilde{Z}(k) &= h^H(k)R^{-1}(k)X(k) \\ &= h^H(k)R^{-1}(k)(g(k)h(k)s_T(k) + n'(k)) \\ &= g(k)h^H(k)R^{-1}(k)h(k)s_T(k) + n(k) \\ &= g(k)A(k)s_T(k) + n(k),\end{aligned} \quad (7)$$

where $A(k) = h^H(k)R^{-1}(k)h(k)$, and $n(k) = h^H(k)R^{-1}(k)n'(k)$. The variance of the noise n(k) is:

$$\sigma_n^2 = h^H(k)R^{-1}(k)h(k). \quad (8)$$

However, if the composite channel response for the traffic channel is assumed to be g(k)h(k), optimal combining weights for the traffic channel may be given by:

$$w_T(k) = g(k)h^H(k)R^{-1}(k) \quad (9)$$

and optimal soft values are given by:

$$\begin{aligned}Z(k) &= g(k)h^H(k)R^{-1}(k)X(k) \\ &= g(k)\tilde{Z}(k).\end{aligned} \quad (10)$$

According to embodiments of the present invention, maximum likelihood solutions for a gain multiplier as described above may be generated from a channel estimate for a pilot channel and information received over a traffic channel. For a group of symbols, e.g., a power control group, let $\tilde{g}(i)$ be the gain multiplier for power control group i, $\tilde{g}(i) = g(iM) = \ldots = g(iM+M-1)$, where M is the number of symbols in a power control group. Given the soft values $\tilde{Z}(i) = (\tilde{Z}(iM), \ldots, \tilde{Z}(iM+M-1))^T$ and decoded symbols $\hat{s}_T(iM), \ldots, \hat{s}_T(iM+M-1)$, a maximum likelihood solution $\tilde{g}_{ML}(i)$ for the gain multiplier $\tilde{g}(i)$ is a least squares (LS) solution given by minimizing the metric J given by:

$$J = \sum_{k=iM}^{iM+M-1} |\tilde{Z}(k) - gA(k)\hat{s}_T(k)|^2 \quad (11)$$

The solution is given by:

$$\tilde{g}_{ML}(i) = \frac{\sum_{k=iM}^{iM+M-1} A(k)\text{Re}\{\tilde{Z}(k)\hat{s}_T^*(k)\}}{\sum_{k=iM}^{iM+M-1} A^2(k)}, \quad (12)$$

where $\hat{s}_T(k)$ are estimates for the transmitted symbols $s_T(k)$. For quadrature phase shift keying (QPSK) modulation, the symbol estimates $\hat{s}_T(k)$ may be given by:

$$\hat{s}_T(k) = sgn\{Re\{\tilde{Z}(k)\}\} + jsgn\{Im\{\tilde{Z}(k)\}\}, \quad (13)$$

where sgn(x)=1, x>0; −1, otherwise. For the symbol estimates given in (13), the gain multiplier can be expressed directly in terms of the soft values.

For binary phase shift keying (BPSK) modulation, the symbol estimates $\hat{s}_T(k)$ may be given by:

$$\hat{s}_T(k) = sgn\{Re\{\tilde{Z}(k)\}\}. \quad (14)$$

Alternatively, the symbol estimates $\hat{s}_T(k)$ can be generated using multipass decoding, in which the soft values $\tilde{Z}(k)$ are passed to a decoder, for example, a forward error correction (FEC) decoder, and the decoded bits are used as the symbol estimates $\hat{s}_T(k)$.

For some embodiments of the present invention, such as embodiments compatible with third-generation CDMA systems, a gain multiplier may be viewed as a product of a slow gain multiplier associated with a slow transmit power control mechanism and a fast gain multiplier associated with a fast transmit power control mechanism. For example, the slow gain multiplier may account for slow gain control that compensates for path loss and shadowing effects, while the fast gain multiplier may account for fast gain control used to combat fading. For a system using variable spreading factors, the slow gain multiplier may also account for a difference between spreading factors used for the pilot channel and the traffic channel. The slow gain multiplier may be relatively constant over the duration of a frame or other predefined data block, while the fast gain multiplier may be a step function that remains constant within a "power control group," slot, or other predefined grouping within the data block, but that changes in a constrained manner, e.g., by a predetermined increment/decrement, from one group to the next. The power control group may be defined to account for delay in when a power control command takes effect.

Figure 3:
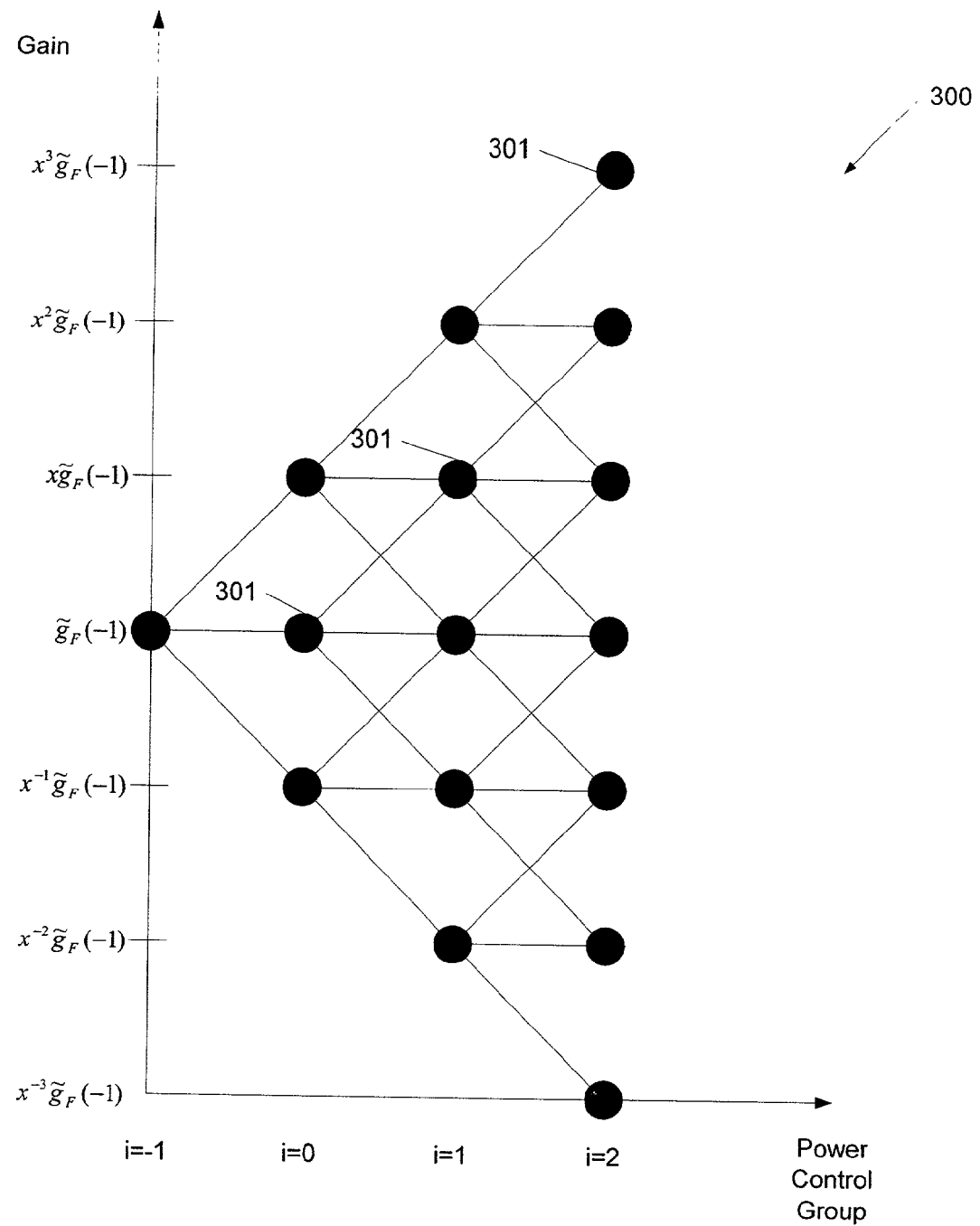
FIG. 3 is a trellis diagram illustrating state transitions of channel gain according to embodiments of the present invention.

According to embodiments of the present invention, for applications in which transmit power is controlled for groups of transmitted symbols ("power control groups"), a fast gain multiplier $g_F(k)$ and a slow gain multiplier $g_S(k)$ may be estimated by exploiting a priori knowledge regarding power control relationships among groups of symbols. Let an estimated fast gain multiplier be denoted as $\tilde{g}_F(i) = g_F(iM) = \ldots = g_F(iM+M-1)$ and an estimated slow gain multiplier be denoted as $\tilde{g}_S(i) = g_S(iM) \ldots = g_S(iM+M-1)$. The estimated fast gain multiplier $\tilde{g}_F(i)$ may follow a trellis 300 as illustrated in FIG. 3. Each node 301 of the trellis 300 represents a hypothesized value for the estimated fast gain multiplier $\tilde{g}_F(i)$, wherein possible transitions of the estimated fast gain multiplier $\tilde{g}_F(i)$ from power control group i to i+1 are indicated $\tilde{g}_F(i+1) = x\tilde{g}_F(i)$, or $\tilde{g}_F(i+1) = \tilde{g}_F(i)$, or $\tilde{g}_F(i+1) = \tilde{g}_F(i)/x$. It may be assumed that the slow gain multiplier $g_S(k)$ is constant throughout a coded frame, such that, for K power control groups in the jth frame, $\tilde{g}_S(jK) \approx \tilde{g}_S(jK+1) \ldots \approx \tilde{g}_S(jK+K-1)$.

According to some embodiments of the present invention, a slow gain multiplier estimate $\tilde{g}_S(i)$ and a fast gain multiplier estimate $\tilde{g}_F(i)$ can be generated using the following process:

I. Estimate $\tilde{g}_S(jK)$ Given $\tilde{g}_F(jK) \ldots \tilde{g}_F(jK+K-1)$:

A maximum likelihood solution can be found by finding the gain multiplier, $\tilde{g}_{S,ML}$, that minimizes the following metric J:

$$J = \sum_{k=jMK}^{jMK+MK-1} \left| \tilde{Z}(k) - \tilde{g}_S \tilde{g}_F\left(\left\lfloor \frac{k}{M} \right\rfloor\right) A(k) \hat{s}_T(k) \right|^2 \quad (15)$$

$$= \frac{\sum_{k=jMK}^{jMK+MK-1} \tilde{g}_F\left(\left\lfloor \frac{k}{M} \right\rfloor\right) A(k) \text{Re}\{\tilde{Z}(k) \hat{s}_T^*(k)\}}{\sum_{k=jMK}^{jMK+MK-1} \tilde{g}_F^2\left(\left\lfloor \frac{k}{M} \right\rfloor\right) A^2(k)}. \quad (16)$$

II. Estimate $\tilde{g}_F(jK) \ldots \tilde{g}_F(jK+K-1)$ Given $\tilde{g}_S(jK-1)$ and $\tilde{g}_F(jK-1)$:

A Viterbi algorithm may be applied to find a maximum likelihood trellis path through the trellis 300 in FIG. 3. A branch metric for the Viterbi algorithm maybe given by:

$$\gamma_k(m, m') \stackrel{\Delta}{=} P(\tilde{g}_F(k) = m; \tilde{Z}(k) | \tilde{g}_F(k-1) = m') \quad (17)$$

$$= \frac{P(\tilde{Z}(k) | \tilde{g}_F(k) = m; \tilde{g}_F(k-1) = m') P(\tilde{g}_F(k) = m; \tilde{g}_F(k-1) = m')}{P(\tilde{g}_F(k-1) = m')},$$

$$= P(\tilde{Z}(k) | \tilde{g}_F(k) = m) P(\tilde{g}_F(k) = m | \tilde{g}_F(k-1) = m'),$$

where, according to FIG. 3.

$$P(\tilde{g}_F(k) = m | \tilde{g}_F(k-1) = m') = \begin{cases} p(k) & m/m' = x \\ q(k) & m'/m = x \\ 1 - p(k) - q(k) & m = m' \\ 0 & \text{otherwise} \end{cases} \quad (18)$$

$$x = 10^{\frac{xdB}{10}}, \text{ and}$$

$$P(\tilde{Z}(k) | \tilde{g}_F(k) = m) \quad (19)$$

$$= \frac{1}{\pi^M \sigma_n^{2M}} \exp\left\{ -\frac{1}{\sigma_n^{2M}} \sum_{i=kM}^{kM+M-1} \left| \tilde{Z}(i) - \tilde{g}_S(jK-1) m A(i) \hat{s}_T(i) \right|^2 \right\}.$$

According to equation (19), a priori information about state transition probabilities for transmit power control can be used in finding a maximum likelihood trellis path. For example, a receiving unit, for example, a mobile terminal, may know what power control requests it gave during a slot k. For example, if the receiving station requested an increase by x during a k-th slot, one could use p(k)=0.8 and q(k)=0.1. If such a priori information is not available, state transition probabilities can be given by:

$$P(\tilde{g}_F(k) = m | \tilde{g}_F(k-1) = m') = \begin{cases} 1/3 & m/m' = x, 1/x, 1 \\ 0 & \text{otherwise} \end{cases} \quad (20)$$

For this case, after taking a natural logarithm and dropping out of the constant terms, the branch metric can be simplified to:

$$\gamma_k(m, m') = \quad (21)$$

$$\begin{cases} -\sum_{i=kM}^{kM+1M-1} \left| \tilde{Z}(i) - \tilde{g}_S(jK-1) m A(i) \hat{s}_T(i) \right|^2 & m/m' = x, 1/x, 1 \\ -\infty & \text{otherwise} \end{cases}.$$

The iterative procedure described above can be initialized as follows: For example, group-by-group LS estimates $\tilde{g}_{ML}(0), \ldots, \tilde{g}_{ML}(K-1)$ for K groups of a first coded frame may be generated. Setting an estimated fast gain multiplier for a first group of the first frame $\tilde{g}_F(0)=1$, fast gain multiplier estimates $\tilde{g}_F(i)$ for groups i=1, ..., K-1 can then be estimated by:

$$\tilde{g}_F(i) = \frac{\tilde{g}_{ML}(i)}{\tilde{g}_{ML}(i-1)} \prod_{j=0}^{i-1} \tilde{g}_F(j), \, i = 1, \ldots, K-1. \quad (22)$$

One possible sub-optimal approach to estimating a gain multiplier g(i) is to modify equation (7) assuming a high signal to noise ratio. Neglecting noise n(k), equation (7) may be multiplied by the conjugate of the symbol estimates $s_T^*(k)$ and the result divided by A(k). Averaging this estimation over the M symbols for which g(k) is constant yields:

$$\tilde{g}(i) = \frac{1}{M} \sum_{k=iM}^{iM+M-1} \frac{\text{Re}\{\tilde{Z}(k)\hat{s}_T^*(k)\}}{A(k)}. \quad (23)$$

Alternatively, one could form:

$$\tilde{g}(i) = \frac{1}{M} \sum_{k=iM}^{iM+M-1} \frac{|\tilde{Z}(k)\hat{s}_T^*(k)|}{A(k)}. \quad (24)$$

Transmit diversity schemes are available options in many systems, including those conforming with IS-2000 and WCDMA standards. In these schemes, multiple co-located antennas transmit block-coded symbols to achieve higher diversity gain. For example, the Space-Time Transmit Diversity (STTD) in WCDMA transmits two QPSK symbols $s_T(k)$, $o_T(k)$ over two consecutive symbol intervals using two transmit antennas. In particular, the first antenna transmits $s_T(k)$ in a first symbol interval and then transmits $o_T(k)$ in a second symbol interval, while the second antenna transmits $-o_T^*(k)$ in the first symbol interval and $S_T^*(k)$ in the second symbol interval.

Other transmit diversity schemes, such as Orthogonal Transmit Diversity (OTD) and Space-Time Spreading (STS) in IS-2000, are coded differently, but have similar structures. The processed and despread values for all three cases can be expressed in a matrix form as:

$$\begin{bmatrix} X(k) \\ Y^*(k) \end{bmatrix} = H(k) \begin{bmatrix} s_T(k) \\ o_T(k) \end{bmatrix} g(k) + \begin{bmatrix} n'(k) \\ v'(k) \end{bmatrix}, \quad (25)$$

where X(k) and Y(k) are the vectors of the despread values corresponding to first and second symbol intervals, respectively, n'(k) and v'(k) are their corresponding noise components and H(k) is a matrix depending on the specific transmit diversity scheme employed. For STTD in WCDMA, H(k) may be given by:

$$H(k) = \begin{bmatrix} h_1(k) & h_2(k) \\ h_2^*(k) & -h_1^*(k) \end{bmatrix}, \quad (26)$$

where $h_1(k)$ is the composite channel response of the radio channel between the first transmit antenna and the receiving entity and $h_2(k)$ is the composite channel response of the radio channel between the second transmit antenna and the receiving entity. With this matrix representation, the derivation provided above for the single antenna case can be easily extended to embodiments of the present invention that use transmit diversity.

Let in $X'(k)=[X^T(k),Y^T(k)]^T$, $S'_T(k)=[S_T(k),o_T(k)]^T$ and $N'(k)=[(n'(k))^T, (v'(k))^T]^T$, equation (25) can be rewritten as:

$$X'(k)=H(k)S'(k)g(k)+N'(k). \quad (27)$$

The combining weights are given by $W'(k)=H^H(k)R_{N'}^{-1}(k)$, where $R_{N'}^{-1}(k)$ is the correlation of N'(k). The combiner output may then be expressed as:

$$Z'(k)=H^H(k)R_{N'}^{-1}(k)H(k)S'(k)g(k)+N''(k). \quad (28)$$

Letting $\hat{S}'_T(k)$ be detected symbol vector, the gain factor g(k) can be solved by minimizing the metric:

$$J = \sum_{k=iM}^{iM+M-1} \left(Z'(k) - H^H(k)R_{N'}^{-1}(k)H(k)\hat{S}'(k)g(i)\right)^H \quad (29)$$

$$\left(Z'(k) - H^H(k)R_{N'}^{-1}(k)H(k)\hat{S}'(k)g(i)\right).$$

A solution may be given by:

$$\hat{g}(i) = \frac{\sum_{k=im}^{iM+M-1} \text{Re}\{(Z'(k))^H B(k)\}}{\sum_{k=im}^{iM+M-1} |B(k)|^2}, \quad (30)$$

where $B(k)=H^H(k)R_{N'}^{-1}(k)H(k)\hat{S}'(k)$.

Figure 4:
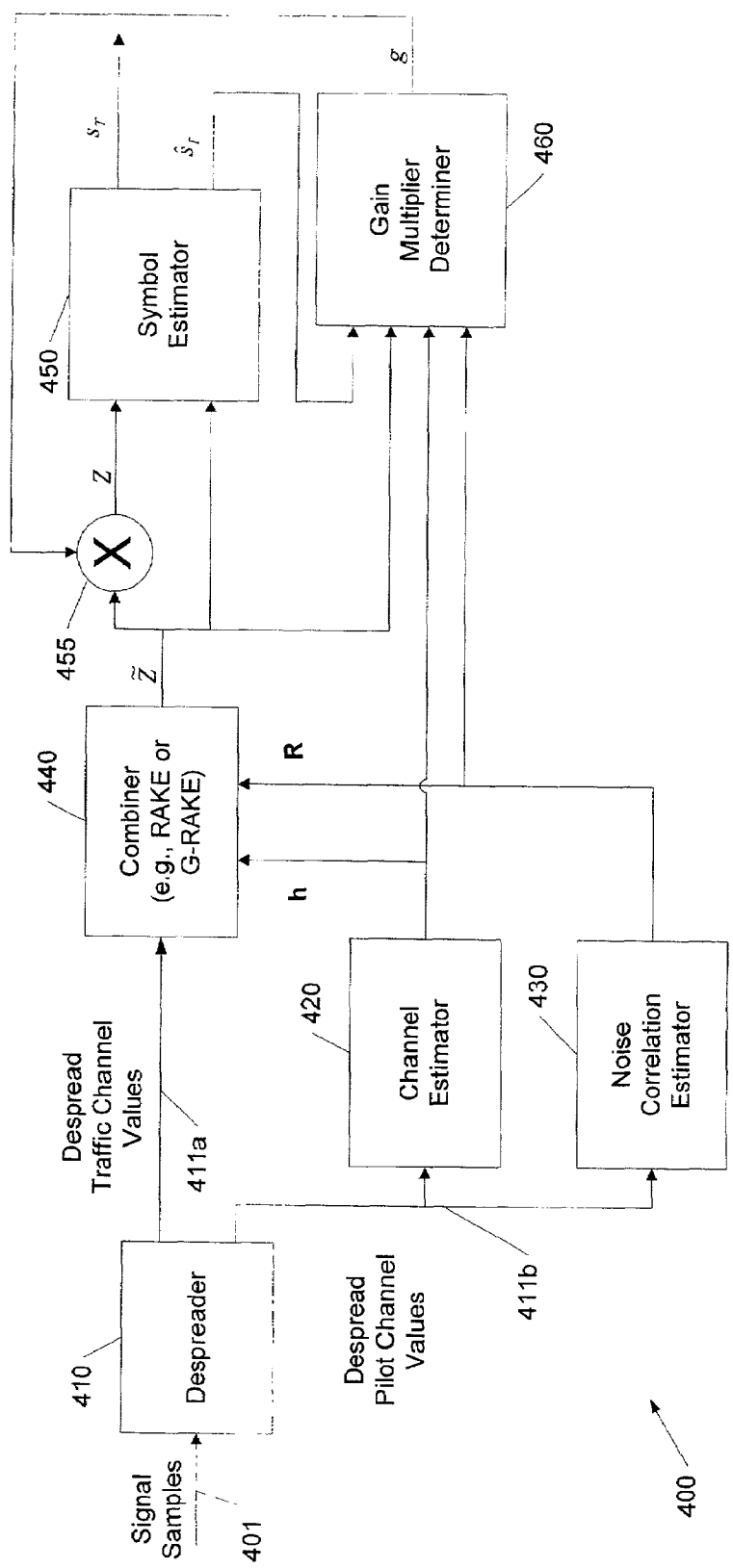
FIG. 4 is a schematic diagram illustrating a wireless communications apparatus according to embodiments of the present invention.

FIG. 4 illustrates a signal processing apparatus 400 according to embodiments of the present invention, in particular, a signal processing apparatus that may be employed in a receiver of a wireless communications device, such as a mobile terminal. Signal samples 401 corresponding to information received over a pilot channel and a traffic channel are provided. Apparatus (not shown) that produces such samples, for example, radio frequency (RF) to baseband conversion circuitry, is known to those skilled in the art, and will not be discussed herein. The signal samples 401 are despread by a despreader circuit 410, producing respective groups of despread values 411a, 411b corresponding to the pilot channel and the traffic channel. The despread values 411b for the pilot channel are used by a channel estimator circuit 420 to produce a channel estimate h, and are used by a noise correlation estimator circuit 430 to generate an estimated noise covariance matrix R. The channel estimate h and the noise covariance matrix R are passed to a combiner circuit 440.

The combiner circuit 440 combines the despread traffic channel values 411a according to the channel estimate h and the noise covariance matrix R to produce initial soft values $\tilde{Z}$, i.e., values that indicate probabilities that particular traffic channel symbols have particular values assuming that the traffic channel has the same channel response and noise covariance as the pilot channel (as used herein, such soft values, or hard decisions made therefrom, may be considered "symbol estimates"). The combiner circuit 440 may comprise, for example, a conventional RAKE combiner that uses combining weights and delays that correspond to the channel estimate h. In this case the noise correlation estimator 430 may be omitted. Alternatively, the combiner circuit 440 may comprise a so-called "generalized" RAKE combiner that uses the additional noise correlation estimator output in generating weighting factors and delays, as described in U.S. patent application Ser. No. 09/165,647 to G.E. Bottomley, titled "Method and Apparatus for Interference Cancellation in a RAKE Receiver," filed Oct. 2, 1998, now U.S. Pat. No. 6,363,104; U.S. patent application Ser. No. 09/344,898 to Bottomley et al, filed Jun. 25, 1999, now U.S. Pat. No. 6,801,565; and U.S. patent application Ser. No. 9/420,957 to Ottosson et al., filed Oct. 19, 1999, now U.S. Pat. No. 6,683,924 the disclosures of which are incorporated by reference herein in their entirety.

The initial soft values $\tilde{Z}$ are passed to a symbol estimator circuit 450, which generates initial symbol estimates $\hat{s}_T$, for example, symbol estimates generated from received traffic channel data assuming that the traffic channel has the same channel response as the pilot channel, as described above. The symbol estimator circuit 450 may, for example, generate the symbol estimates $\hat{s}_T$ from the soft values $\tilde{Z}$ using algebraic formulae such as the formulae in equations (13) and (14), or may decode the soft values $\tilde{Z}$ using, for example, an FEC decoder. Operations of such decoders are known to those skilled in the art, and will not be discussed in detail herein.

The channel estimate h, the noise correlation matrix R, the initial soft values $\tilde{Z}$, and the initial symbol estimates $\hat{s}_T$ are passed to a gain multiplier determiner circuit 460 that determines a gain multiplier g using, for example, one or more of the estimation processes described above. As illustrated in FIG. 4, the gain multiplier g may then be used to multiply the initial soft values $\tilde{Z}$ to produce new soft values Z. The symbol estimator may then generate new symbol estimates $s_T$ from the new soft values Z.

It will be understood that the structure and operations illustrated in FIG. 4 may be varied within the scope of the present invention. For example, rather than multiplying the soft values $\tilde{Z}$ by the gain multiplier g to generate new soft values Z, the gain multiplier could be used to multiply the channel estimate h, producing a scaled channel response gh that may be used to process the despread traffic channel values 411a in the combiner circuit 440 to generate the new soft values Z. In some embodiments, such as those discussed below with reference to FIG. 6, a gain multiplier may be determined from a channel estimate, noise correlation and soft values without use of initial symbol estimates $\hat{s}_T$ described above.

It will be further appreciated that the apparatus 400 may be embodied in a number of different forms, including hardware, software (or firmware), or combinations thereof. For example, the despreader circuit 410, the channel estimator circuit 420, the noise covariance estimator circuit 430, the combiner circuit 440, the symbol estimator circuit 450, and the gain multiplier determiner circuit 460 may be implemented using special purpose hardware, such as special-purpose logic circuitry, programmable logic devices (PLDs), programmable gate arrays and/or application specific integrated circuits (ASICs), and/or as software or firmware executing on one or more data processing devices, such as digital signal processor (DSP) chips.

Figure 5:
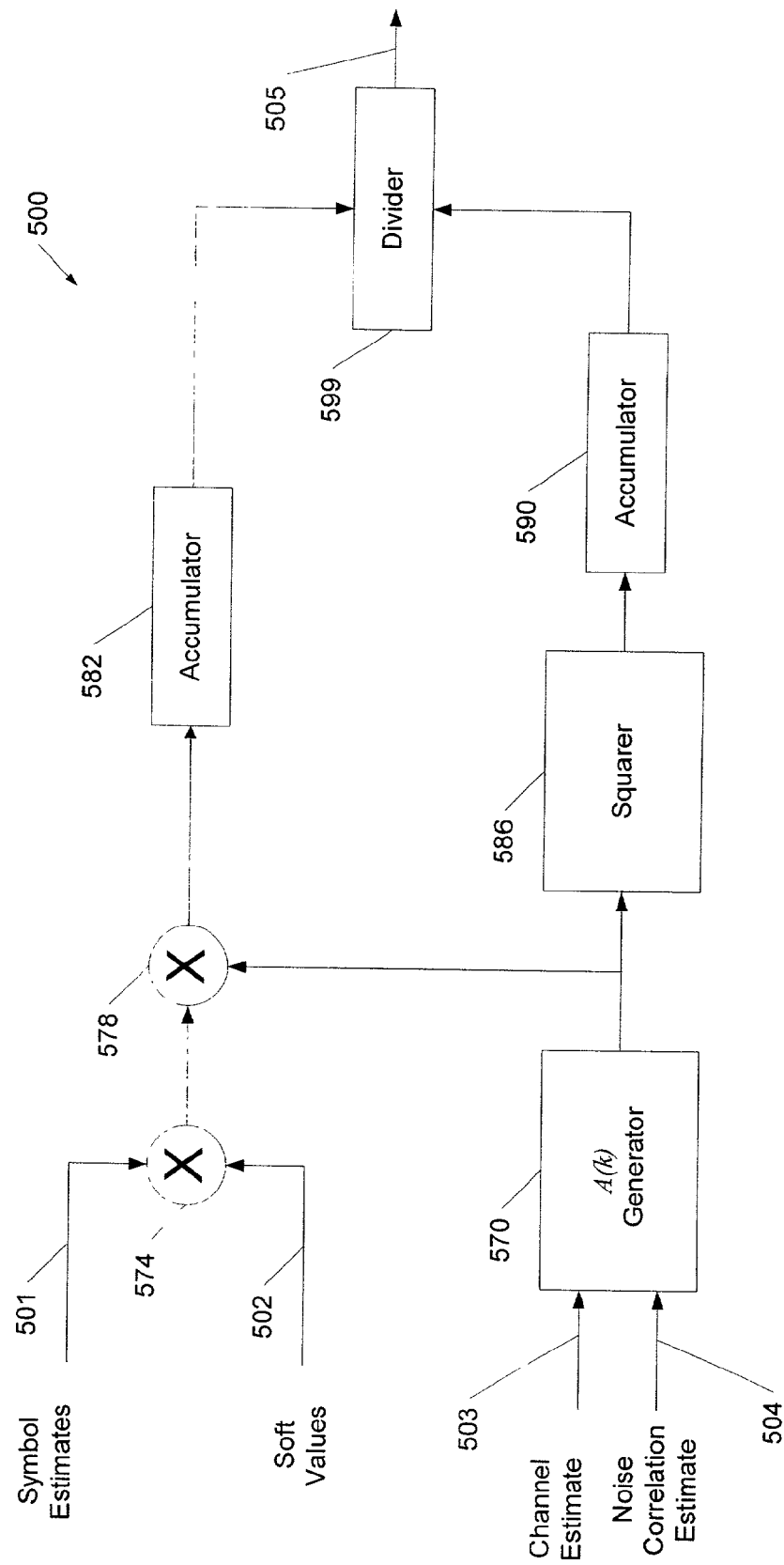
FIGS. 5–7 are schematic diagram illustrating gain multiplier determiner circuits according to various embodiments of the present invention.

FIG. 5 illustrates a gain multiplier determiner circuit 500 based on equation (13) according to some embodiments of the present invention. Complex symbol estimates 501 and soft values 502 are provided to a multiplier 574, which forms the real part of the product of the complex values. A channel estimate 503 and a noise correlation estimate 504 are provided to an A(k) generator 570. The real products produced by the first multiplier 574 and the A(k) produced by the A(k) generator 570 are provided to a second multiplier 578, which produces real products that are accumulated over multiple symbol periods in a first accumulator 582. A(k) produced by the A(k) generator 570 are also provided to a squarer 586, which produces squared values that are accumulated in a second accumulator 590. The output of the first accumulator 582 is divided by the output of the second accumulator 590 in a divider 599, which produces gain multiplier values 505.

The A(k) generator 570 can produce A(k) values in a number of ways. According to some embodiments, $w=R^{-1}h$, which, for example, corresponds to the combining weights in the combiner 440 of FIG. 4 when the combiner 440 is a G-RAKE combiner, may be determined using, for example, the Gauss-Seidel procedure as described in Wang et al., pending U.S. Ser. No. 09/344,899, filed Jun. 25, 1999. A(k) can be determined by an inner product of a channel estimate with the weights, i.e., by forming $A(k)-h^H w$.

Another suboptimal approach according to embodiments of the present invention is based on estimating the power in the traffic channel and the power in the pilot channel. The square root of the ratio of these two powers corresponds to the gain multiplier. Power estimation can be performed after RAKE or G-RAKE combining.

Figure 6:
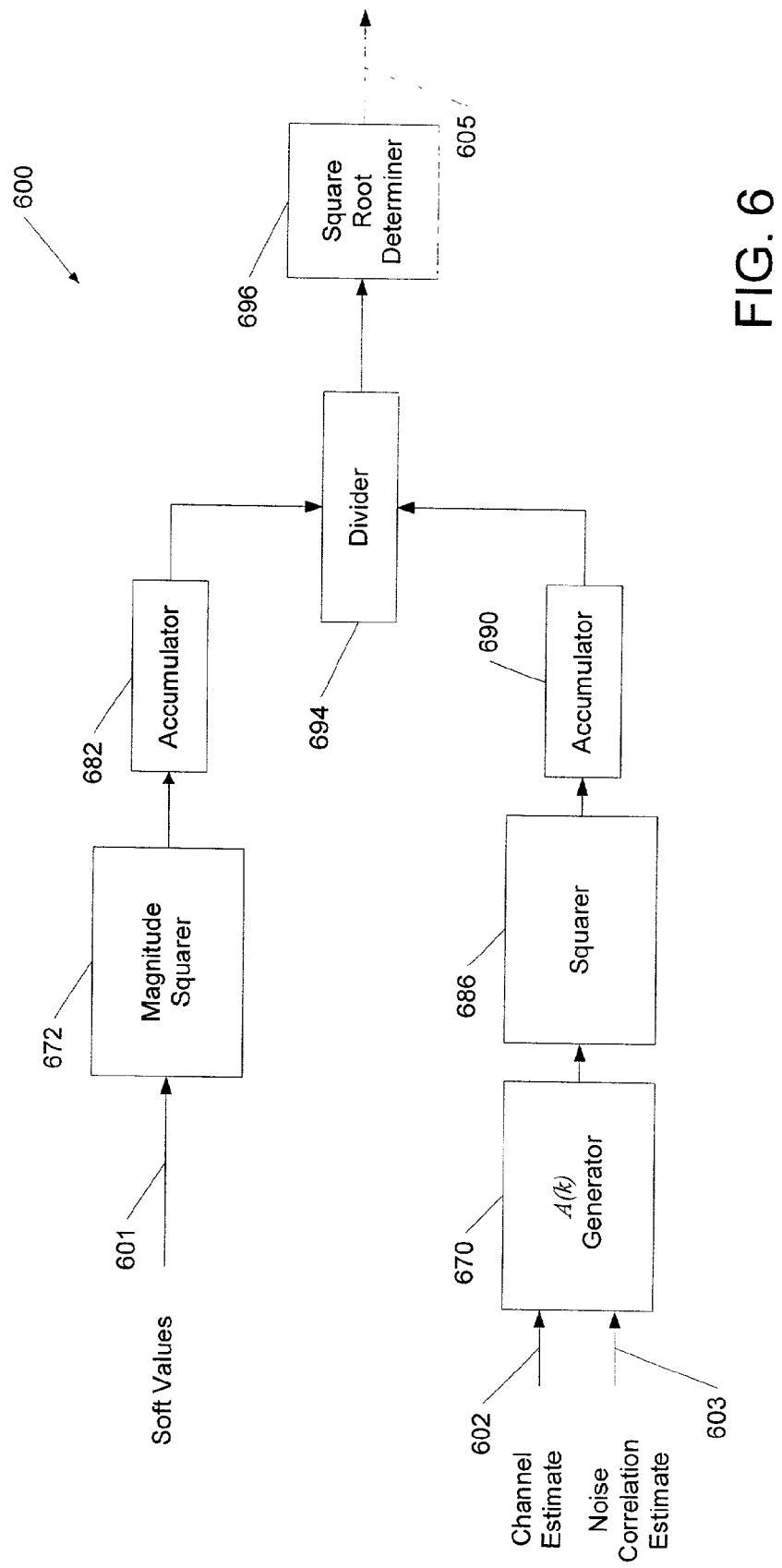

FIG. 6 illustrates a gain multiplier determiner circuit 600 according to such embodiments of the present invention, where use of a G-RAKE receiver is assumed. Complex soft values 601 are provided to magnitude squarer 672, which determines a magnitude square of the complex soft values by, for example, summing the squares of the real and imaginary components (unlike FIG. 5, symbol estimates are not used). The output of the magnitude squarer 672 is provided to a first accumulator 682, which accumulates the magnitude square values over multiple symbol periods. A channel estimate 602 and a noise correlation estimate 603 are provided to an A(k) generator 670. A(k) from the A(k) generator 670 are provided to a squarer 686, which produces squared values that are accumulated in a second accumulator 690. The output of the first accumulator 682 is divided by the output of the second accumulator 690 in a divider 694. A square root determiner 696 determines square roots of the values produced by the divider 694 to generate gain multiplier values 605.

Figure 7:
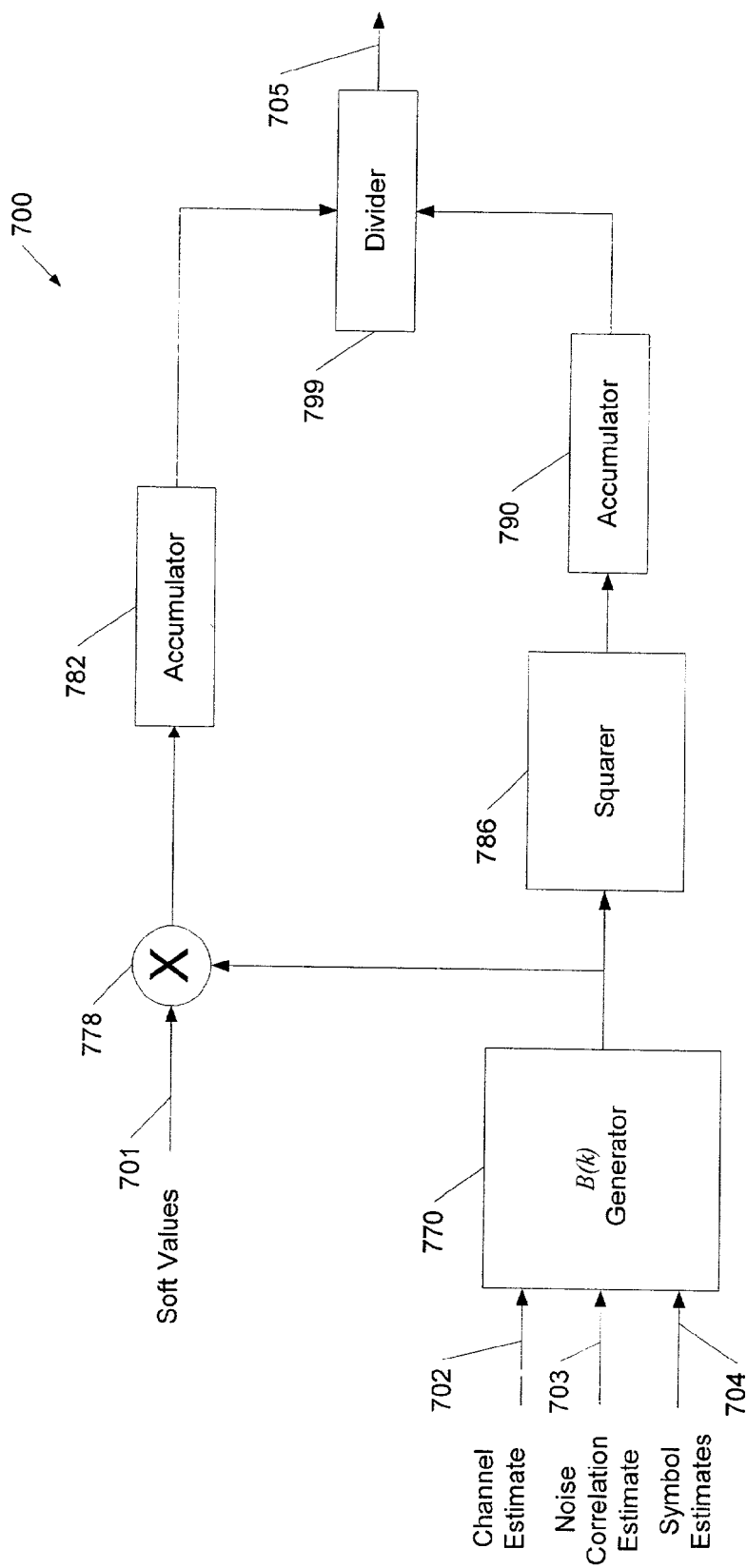

FIG. 7 illustrates a gain multiplier determiner circuit 700 according to further embodiments of the present invention, in particular, for use in the case of transmit antenna diversity. A channel estimate 702 (e.g., H(k)), a noise correlation estimate 703 (e.g., $R_N(k)$ ), and a symbol estimate 704 (e.g., $\hat{S}'(k)$) are provided to a B(k) generator 770. Soft values 701 and B(k) from the B(k) generator 770 are provided to a multiplier 778, which produces real products that are accumulated over multiple symbol periods in a first accumulator 782. B(k) from the B(k) generator 770 are also provided to a squarer 786, which produces squared values that are accumulated in a second accumulator 790. The output of the first accumulator 782 is divided by the output of the second accumulator 790 in divider 794, which produces gain multiplier values 705.

Figure 8:
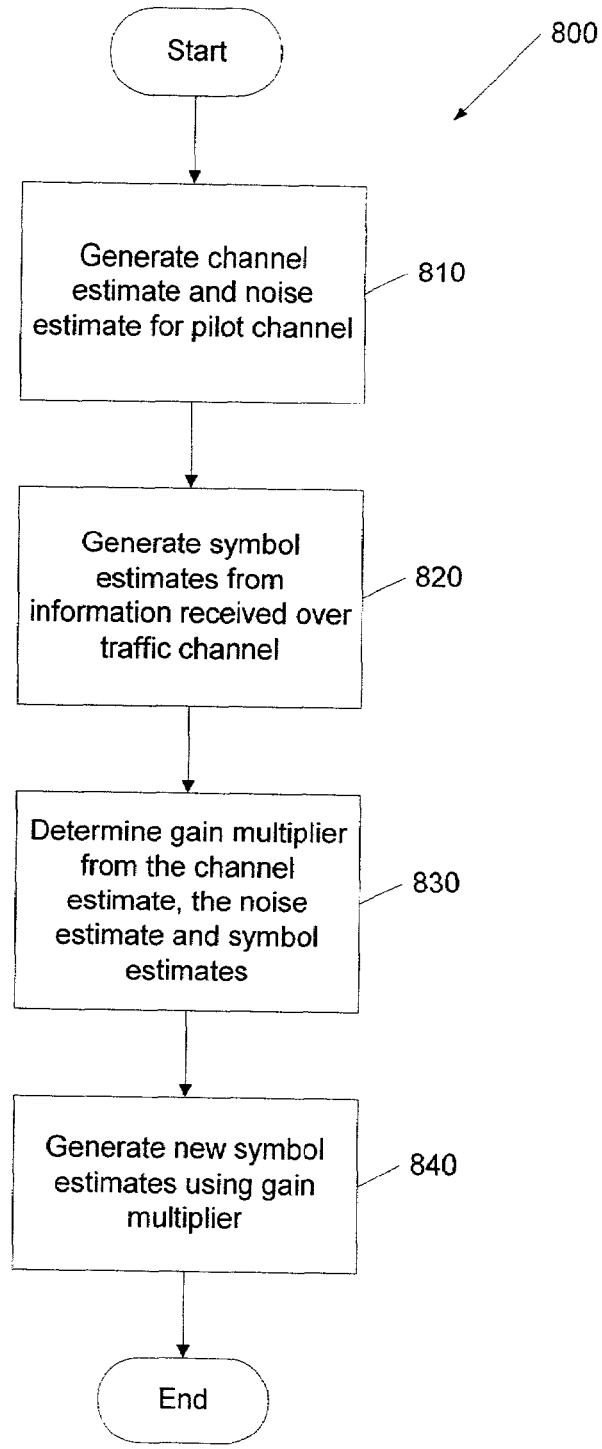
FIGS. 8 and 9 are flowcharts illustrating exemplary symbol estimation operations according to embodiments of the present invention.

FIG. 8 illustrates exemplary operations 800 for generating symbol estimates using an estimated gain multiplier according to embodiments of the present invention. A channel estimate and a noise estimate (e.g., a noise covariance matrix) are generated from despread pilot symbol values (Block 810). Symbol estimates, for example, soft values and corresponding hard symbol estimates, are generated from information received over the traffic channel, e.g., from despread traffic channel values (Block 820). A gain multiplier is determined from the channel estimate, the noise estimate and the symbol estimates (Block 830). New symbol estimates are generated using the gain multiplier (Block 840).

Figure 9:
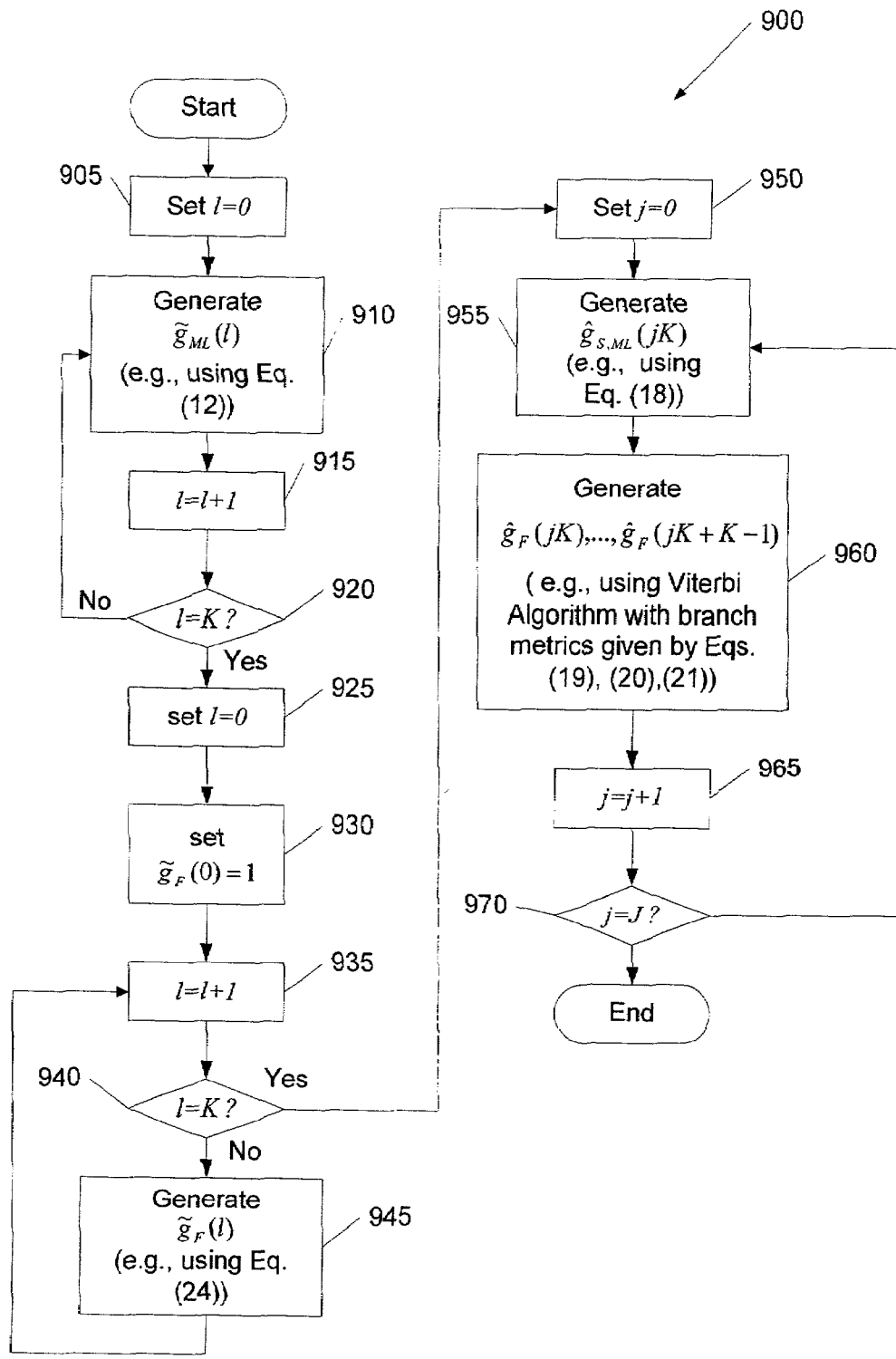

As described above, in many applications it may be possible to model a gain multiplier as including first and second gain multipliers that correspond to respective first and second power control mechanisms that act at different rates. FIG. 9 illustrates exemplary operations 900 for estimating slow and fast gain multipliers according to embodiments of the present invention. A count l is initialized (Block 905) before entering an iterative loop in which respective maximum likelihood gain multiplier estimates $\tilde{g}_{ML}(l)$ for respective groups of symbols (e.g., power control groups) of a first frame are estimated using, for example, equation (12) (Blocks 910, 915, 920). After gain multiplier estimates $\tilde{g}_{ML}(l)$ are generated for the K groups (e.g., power control groups) of the first frame, the count l is reinitialized (Block 925). A first fast gain multiplier estimate $\tilde{g}_F(l)$ (l=0) for a first power control group of the first frame is set to a predetermined value of one (1) (Block 930). An iterative loop is then entered in which respective fast gain multiplier estimates $\tilde{g}_F(l)$ for respective groups of symbols of the first frame are generated from the maximum likelihood gain multiplier estimates $\tilde{g}_{ML}(l)$ using, for example, equation (22) (Blocks 935, 940, 945).

A second count j is then initialized (Block 950), and another iterative loop (Blocks 955, 960, 965, 970) is entered in which respective estimated slow gain multipliers $\hat{g}_S$ are generated for each frame of a group of J frames, and in which respective estimated fast gain multipliers $\hat{g}_F$ are generated for respective groups of symbols in the J frames. In each iteration, a slow gain multiplier estimate $\hat{g}_S(jK)$ for a j-th frame is generated from the initial fast gain multiplier estimates $\tilde{g}_F$ using, for example, equation (16) (Block 955). Respective fast gain multiplier estimates $\hat{g}_F(jK)$ ..., $\hat{g}_F(jK+K-1)$ for respective groups of symbols of the j-th frame are estimated from the slow gain multiplier estimate $\hat{g}_S(jK)$ using, for example, a Viterbi algorithm that employs the branch metrics described by equations (17)–(18) (Block 960). The iterations proceed until all of the J frames have been processed (Block 970).

It will be understood that the apparatus and operations of FIGS. 8 and 9 may be implemented in various ways within the scope of the present invention. For example, the initialization operations (Blocks 905–945) of FIG. 9 may include the maximum likelihood estimation procedure described above with reference to equations (11)–(16), or the ad hoc procedure described above with reference to equations (23)–(24).

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of processing a received communications signal to recover information contained therein, said signal comprising separate first and second channels, the method comprising:

processing the communications signal to dynamically determine a proportionality relationship between a gain of the first channel and a gain of the second channel, wherein the step of dynamically determining a proportionality relationship includes generating an estimate of a gain multiplier from information received over the second channel, a channel estimate for the first channel, and a noise estimate for the first channel; and recovering information from the second channel utilizing the determined proportionality relationship.

2. The method of claim 1, further comprising generating symbol estimates from information received over the second channel based on the determined proportionality relationship.

3. The method of claim 1, wherein the step of generating an estimate of a gain multiplier includes:

generating despread values from the information received over the second channel;

processing the despread values according to the channel estimate of the first channel to generate symbol estimates; and generating the estimate of the gain multiplier from the noise estimate of the first channel and the symbol estimates.

4. The method of claim 3, wherein the step of processing the despread values according to the channel estimate of the first channel to generate symbol estimates comprises:

generating weighting factors from the channel estimate;

combining the despread values according to the weighting factors to generate soft values; and generating hard symbol estimates from the soft values;

wherein the step of generating the estimate of the gain multiplier from the noise estimate and the symbol estimates comprises generating the estimate of the gain multiplier from the noise estimate, the soft values, and the hard symbol estimates.

5. The method of claim 4, further comprising processing information received over the first channel to generate a noise covariance estimate for the first channel, and wherein the step of generating the estimate of the gain multiplier from the noise estimate, the soft values, and the hard symbol estimates comprises generating the estimate of the gain multiplier from the noise covariance estimate, the channel estimate, the soft values, and the hard symbol estimates.

6. The method of claim 5, wherein the step of generating the estimate of the gain multiplier from the noise-covariance estimate, the channel estimate, the soft values, and the hard symbol estimates comprises generating an estimate $\tilde{g}(i)$ of the gain multiplier for an i-th group of M symbols transmitted over the second channel according to the equation $$\tilde{g}(i) = \frac{\sum_{k=iM}^{iM+M-1} A(k)\mathrm{Re}\{\tilde{Z}(k)\hat{s}_T^*(k)\}}{\sum_{k=iM}^{iM+M-1} A^2(k)}$$

wherein the $\tilde{Z}(k)$ are soft values for the M symbols that are generated from the information received over the second channel using the channel estimate and the noise covariance estimate for the first channel;

wherein the $\hat{s}_T(k)$ are corresponding hard symbol estimates for the second channel; and wherein A(k) is determined by the channel estimate and the noise covariance estimate of the first channel.

7. The method of claim 4, wherein the step of generating the estimate of the gain multiplier from the noise-estimate, the channel estimate, the soft values, and the hard symbol estimates comprises generating an estimate $\tilde{g}(i)$ of the gain multiplier for an i-th group of M symbols transmitted over the second channel according to the equation $$\tilde{g}(i) = \frac{1}{M} \sum_{k=iM}^{iM+M-1} \frac{\text{Re}\{\tilde{Z}(k) * \hat{s}_T^*(k)\}}{A(k)}$$

wherein the $\tilde{Z}(k)$ are soft values for the M symbols that are generated from the information received over the second channel using the channel estimate and a noise covariance estimate for the first channel;

wherein the $\hat{s}_T(k)$ are corresponding hard symbol estimates for the second channel; and wherein A(k) is determined by the channel estimate and the noise covariance estimate of the first channel.

8. The method of claim 3, wherein the step of processing the despread values according to the channel estimate to generate symbol estimates comprises:

generating weighting factors from the channel estimate of the first channel; and combining the despread values of the second channel according to the weighting factors to generate soft values;

wherein the step of generating the estimate of the gain multiplier from the noise estimate and the symbol estimates comprises generating the estimate of the gain multiplier from the noise estimate and the soft values.

9. The method of claim 8, further comprising processing information received over the first channel to generate a noise covariance estimate for the first channel, and wherein the step of generating the estimate of the gain multiplier from the noise estimate and the soft values comprises generating the estimate of the gain multiplier from the noise covariance estimate, the channel estimate and the soft values.

10. The method of claim 1, wherein the step of processing the communications signal to determine a proportionality relationship includes determining first and second gain multipliers associated with respective first and second gains of the second channel that change at respective first and second rates.

11. The method of claim 10, wherein the second rate is greater than the first rate.

12. The method of claim 10, wherein the step of determining first and second gain multipliers includes generating an estimate of the second gain multiplier based on an estimate of the first gain multiplier and information regarding state transition probabilities of the second gain of the second channel.

13. The method of claim 12, wherein the information regarding state transitional probabilities comprises transmit power control information.

14. The method of claim 13, wherein the step of generating an estimate of the second gain multiplier includes applying a Viterbi algorithm employing a branch metric that is a function of the estimate of the first gain multiplier to determine a path through a trellis that describes the state transitions of the second gain of the second channel.

15. The method of claim 10, wherein the step of determining first and second gain multipliers includes generating an estimate of the first gain multiplier from information received over the second channel, a channel estimate for the first channel and a noise estimate for the first channel.

16. The method of claim 15, wherein the step of generating an estimate of the first gain multiplier comprises:

generating despread values from the information received over the second channel;

processing the despread values according to the channel estimate to generate symbol estimates; and generating the estimate of the first gain multiplier from the noise estimate and the symbol estimates.

17. The method of claim 15, wherein generating the estimate of the first gain multiplier also includes generating an estimate $g_S(jK)$ of the first gain multiplier for a plurality of J data blocks transmitted over the second channel, each of which comprise K groups comprising M symbols, by minimizing the metric $$\frac{\sum_{k=jMK}^{jMK+MK-1} \tilde{g}_F\left(\left\lfloor\frac{k}{M}\right\rfloor\right) A(k) \text{Re}\{\tilde{Z}(k)\hat{s}_T^*(k)\}}{\sum_{k=jMK}^{jMK+MK-1} \tilde{g}_F^2\left(\left\lfloor\frac{k}{M}\right\rfloor\right) A^2(k)};$$

wherein the $\tilde{g}_F$ are initial estimates of the second gain multiplier for a first data block of the J data blocks;

wherein the $\tilde{Z}(k)$ are soft values for the symbols of the J data blocks that are generated from the information received over the second channel using the channel estimate and a noise covariance estimate for the first channel;

wherein the $\hat{s}_T(k)$ are corresponding hard symbol estimates for the second channel; and wherein A(k) is determined by the channel estimate and a noise covariance estimate of the first channel.

18. The method of claim 1, wherein the communications signal comprises a wireless communications signal, wherein the first channel comprises a pilot channel, and wherein the second channel comprises a traffic channel.

19. The method of claim 1, wherein the communication signal originates from a plurality of transmit antennas.

20. An apparatus for processing a received communications signal to recover information contained therein, said signal comprising separate first and second channels, the apparatus comprising:

a gain multiplier determiner circuit responsive to the communications signal and operative to dynamically determine a gain multiplier relating a gain of the first channel to a gain of the second channel, wherein the gain multiplier determiner circuit is operative to generate an estimate of the pain multiplier from information received over the second channel, a channel estimate for the first channel and a noise estimate for the first channel; and means for recovering information from the second channel utilizing the determined proportionality relationship.

21. The apparatus of claim 20, wherein the means for recovering information includes a symbol estimator circuit operative to generate symbol estimates from information received over the second channel based on the determined gain multiplier.

22. The apparatus of claim 20, wherein the gain multiplier determiner circuit is operative generate an estimate $\tilde{g}(i)$ of the gain multiplier for an i-th group of M symbols transmitted over the second channel according to the equation $$\tilde{g}(i) = \frac{\sum_{k=iM}^{iM+M-1} A(k)\text{Re}\{\tilde{Z}(k)\hat{s}_T^*(k)\}}{\sum_{k=iM}^{iM+M-1} A^2(k)}$$

wherein the $\tilde{Z}(k)$ are soft values for the M symbols that are generated from the information received over the second channel using the channel estimate and a noise covariance estimate for the first channel;

wherein the $\hat{s}_T(k)$ are corresponding hard symbol estimates for the second channel; and wherein $A(k)$ is determined by the channel estimate and the noise covariance estimate of the first channel.

23. The apparatus of claim 20, wherein the gain multiplier determiner circuit is operative to generate an estimate $\tilde{g}(i)$ of the gain multiplier for an i-th group of M symbols transmitted over the second channel according to the equation $$\tilde{g}(i) = \frac{1}{M}\sum_{k=iM}^{iM+M-1}\frac{\text{Re}\{\tilde{Z}(k)*\hat{s}_T^*(k)\}}{A(k)}$$

wherein the $\tilde{Z}(k)$ are soft values for the M symbols that are generated from the information received over the second channel using the channel estimate and a noise covariance estimate for the first channel;

wherein the $\hat{s}_T(k)$ are corresponding hard symbol estimates for the second channel; and wherein $A(k)$ is determined by the channel estimate and the noise covariance estimate of the first channel.

24. The apparatus of claim 20, wherein the gain multiplier determiner circuit is operative to determine first and second gain multipliers associated with respective first and second gains of the second channel that change at respective first and second rates.

25. The apparatus of claim 24, wherein the second rate is greater than the first rate.

26. The apparatus of claim 24, wherein the gain multiplier determiner circuit is operative to generate an estimate of the second gain multiplier based on an estimate of the first gain multiplier and information regarding state transition probabilities of the second gain of the second channel.

27. The apparatus of claim 26, wherein the information regarding state transitional probabilities comprises transmit power control information.

28. The apparatus of claim 26, wherein the gain multiplier determiner circuit is operative to apply a Viterbi algorithm employing a branch metric that is a function of the estimate of the first gain multiplier to determine a path through a trellis that describes the state transitions of the second gain of the second channel.

29. The apparatus of claim 24, wherein the gain multiplier determiner circuit is operative to generate an estimate $g_S(jK)$ of the first gain multiplier for a plurality of J data blocks transmitted over the second channel, each of which comprise K groups comprising M symbols, by minimizing the metric $$\frac{\sum_{k=jMK}^{jMK+MK-1}\tilde{g}_F\left(\left\lfloor\frac{k}{M}\right\rfloor\right)A(k)\text{Re}\{\tilde{Z}(k)\hat{s}_T^*(k)\}}{\sum_{k=jMK}^{jMK+MK-1}\tilde{g}_F^2\left(\left\lfloor\frac{k}{M}\right\rfloor\right)A^2(k)};$$

wherein the $\tilde{g}_F$ are initial estimates of the second gain multiplier for a first data block of the J data blocks;

wherein the $\tilde{Z}(k)$ are soft values for the symbols of the J data blocks that are generated from the information received over the second channel using the channel estimate and a noise covariance estimate for the first channel;

wherein the $\hat{s}_T(k)$ are corresponding hard symbol estimates for the second channel; and wherein $A(k)$ is determined by the channel estimate and the noise covariance estimate of the first channel.

30. The apparatus of claim 20, wherein the communications signal comprises a wireless communications signal, wherein the first channel comprises a pilot channel, and wherein the second channel comprises a traffic channel.

31. The apparatus of claim 20, wherein the communications signal originates from a plurality of transmit antennas.

32. A wireless communications terminal, comprising:

a receiver operative to receive a communications signal and to process the received signal to recover information contained therein, said signal comprising separate first and second channels, the receiver comprising:

a gain multiplier determiner circuit responsive to the received communications signal and operative to dynamically determine a gain multiplier relating a gain of the first channel to a gain of the second channel, wherein the pain multiplier determiner circuit is operative to generate an estimate of the gain multiplier from information received over the second channel, a channel estimate for the first channel and a noise estimate for the first channel; and a symbol estimator circuit operative to generate symbol estimates from the received communications signal based on the determined gain multiplier.

33. The terminal of claim 32, wherein the communications signal comprises a wireless communications signal, wherein the first channel comprises a pilot channel and wherein the second channel comprises a traffic channel.

34. The terminal of claim 33, wherein the gain multiplier determiner circuit is operative to determine first and second gain multipliers associated with respective first and second gains of the traffic channel that change at respective first and second rates.

35. The terminal of claim 34, wherein the gain multiplier determiner circuit is operative to generate an estimate of the second gain multiplier based on an estimate of the first gain multiplier and information regarding state transition probabilities of the second gain of the traffic channel.

36. The terminal of claim 35, wherein the information regarding state transitional probabilities comprises transmit power control information.

37. A computer program product for processing a received communications signal to recover information contained therein, said signal comprising separate first and second channels, the computer program product comprising computer-readable program code embodied in a computer-readable program storage medium, the computer-readable program code comprising:

first computer-readable program code for processing the communications signal to dynamically determine a proportionality relationship between a gain of the first channel and a gain of the second channel, wherein the first computer-readable program code includes computer program code for generating an estimate of a gain multiplier from information received over the second channel, a channel estimate for the first channel, and a noise estimate for the first channel; and second computer-readable program code for processing the communications signal to recover information from the second channel utilizing the determined proportionality relationship.

38. The computer program product of claim 37, wherein the second computer-readable program code includes computer-readable program code for generating symbol estimates from information received over the second channel based on the determined proportionality relationship.

39. The computer program product of claim 37, wherein the first computer-readable program code includes computer-readable program code for determining first and second gain multipliers associated with respective first and second gains of the second channel that change at respective first and second rates.

40. The computer program product of claim 39, wherein the computer program code for determining first and second gain multipliers includes computer program code for generating an estimate of the second gain multiplier based on an estimate of the first gain multiplier and information regarding state transition probabilities of the second gain of the second channel.

41. The computer program product of claim 37, wherein the communications signal comprises a wireless channel, wherein the first channel comprises a pilot channel, and wherein the second channel comprises a traffic channel.

42. A method of processing a received communications signal to produce final traffic channel symbol estimates, the method comprising:

despreading the received communications signal to form despread traffic channel values and despread pilot channel values;

estimating a channel estimate of the pilot channel utilizing the despread pilot channel values;

calculating soft values of traffic channel symbols utilizing the despread traffic channel values and the channel estimate of the pilot channel;

estimating initial traffic channel symbol estimates based on the soft values of the traffic channel symbols;

calculating a gain multiplier utilizing the channel estimate of the pilot channel and the soft values of the traffic channel symbols, wherein the step of calculating a gain multiplier includes calculating the gain multiplier utilizing the initial traffic channel symbol estimates in addition to the channel estimate and noise estimate of the pilot channel and the soft values of the traffic channel symbols;

calculating new soft values of the traffic channel symbols utilizing the soft values of the traffic channel symbols and the gain multiplier; and recovering information from the received signal utilizing the new soft values of the traffic channel symbols.

* * * * *